(12) United States Patent
Takayama et al.

(10) Patent No.: US 9,970,485 B2
(45) Date of Patent: May 15, 2018

(54) BEARING CAP HAVING SENSOR UNIT, AND ROLLING BEARING UNIT

(71) Applicant: NSK LTD., Tokyo (JP)

(72) Inventors: Akinobu Takayama, Fujisawa (JP); Yukihisa Takayama, Fujisawa (JP); Hiroaki Ishikawa, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/546,741

(22) PCT Filed: Feb. 8, 2016

(86) PCT No.: PCT/JP2016/053658
§ 371 (c)(1),
(2) Date: Jul. 27, 2017

(87) PCT Pub. No.: WO2016/129554
PCT Pub. Date: Aug. 18, 2016

(65) Prior Publication Data
US 2018/0003238 A1   Jan. 4, 2018

(30) Foreign Application Priority Data
Feb. 13, 2015  (JP) ................................. 2015-026377

(51) Int. Cl.
*F16C 41/00* (2006.01)
*F16C 33/72* (2006.01)
*F16C 19/18* (2006.01)

(52) U.S. Cl.
CPC .......... *F16C 41/007* (2013.01); *F16C 19/186* (2013.01); *F16C 33/723* (2013.01); *F16C 2326/02* (2013.01)

(58) Field of Classification Search
CPC ..................................................... F16C 41/007
See application file for complete search history.

(56) References Cited

U.S. PATENT DOCUMENTS 6,127,819 A    10/2000  Ouchi
7,374,344 B2*  5/2008   Shigeoka ............ B60B 27/0005
                                                      324/173

(Continued)

FOREIGN PATENT DOCUMENTS

JP        11142424 A    5/1999
JP     2005249180 A    9/2005

(Continued)

OTHER PUBLICATIONS

International Research Report dated Apr. 19, 2016, by the International Searching Authority in counterpart International Application No. PCT/JP2016/053658 (PCT/ISA/210).

(Continued)

*Primary Examiner* — Thomas R Hannon
(74) *Attorney, Agent, or Firm* — Sughrue Mion, PLLC

(57) ABSTRACT

A holder support part, into which a holder main body part constituting a sensor holder is fitted, is provided to an upper position of two vertically adjacent positions of an axially inboard-side surface of a bottom plate part so as to project. A nut holding part, which holds a nut, into which is threaded a bolt for joining a sensor holder, is provided to a lower position of the two vertically adjacent positions. The holder support part and the nut holding part are apart from each other. The holder support part is configured as a notched cylinder shape having a discontinuous part at a lower part. An upper surface of the nut holding part is configured as a convex curved surface of which a part facing the discontinuous part is positioned at the uppermost part.

2 Claims, 11 Drawing Sheets

(56) References Cited

U.S. PATENT DOCUMENTS

| | | | |
|---|---|---|---|
| 8,210,750 B2* | 7/2012 | Shige | B60B 27/0005 |
| | | | 324/207.25 |
| 8,534,126 B2* | 9/2013 | Serafini | F16C 33/723 |
| | | | 384/448 |
| 8,641,287 B2* | 2/2014 | Inoue | B60B 27/0005 |
| | | | 384/448 |
| 9,056,523 B2* | 6/2015 | Norimatsu | B60B 27/0068 |
| 2015/0231922 A1 | 8/2015 | Kaiser et al. | |

FOREIGN PATENT DOCUMENTS

| | | | |
|---|---|---|---|
| JP | 2006342860 A | 12/2006 | |
| JP | 200968597 A | 4/2009 | |
| JP | 201353638 A | 3/2013 | |
| WO | 2014044261 A1 | 3/2014 | |

OTHER PUBLICATIONS

Written Opinion dated Apr. 19, 2016, by the International Searching Authority in counterpart International Application No. PCT/JP2016/053658 (PCT/ISA/237).

* cited by examiner

BEARING CAP HAVING SENSOR UNIT, AND ROLLING BEARING UNIT

TECHNICAL FIELD

The present invention relates to a bearing cap having a sensor unit and a rolling bearing unit including the bearing cap having a sensor unit.

RELATED ART

A rolling bearing unit having a rotating speed detection device, which is configured by combining a rolling bearing unit for wheel support so as to rotatably support automobile wheels to a suspension device and a rotating speed detection device for detecting a rotating speed of the wheels necessary for control of an ABS and the like, has been widely used in the related art.

FIG. 10 depicts an example of a conventional structure of a rolling bearing unit having a rotating speed detection device, which is disclosed in Patent Document 1. A rolling bearing unit 1 having a rotating speed detection device is configured to rotatably support a hub 3 to an inner diameter-side of an outer ring 2 via a plurality of rolling elements 4, 4. The outer ring is configured not to rotate with being supported and fixed to a suspension device upon using and the hub 3 is configured to rotate together with wheels (not shown) with supporting the wheels upon using. An outer peripheral surface of the outer ring 2 is provided with a fixed-side flange 5 for coupling and fixing to a knuckle (not shown) configuring the suspension device. A part, which is close to an axially outboard end (the term "outboard" with respect to the axial direction indicates an outer side of a vehicle body in a width direction at a mounted state to a vehicle, and is a left side in FIGS. 1, 2, 5, 7, 9 and 10. In contrast, a right side in FIGS. 1, 2, 5, 7, 9 and 10, which is a central side of the vehicle body in the width direction, is referred to as "inboard" with respect to the axial direction. The meanings thereof are the same in the specification and the claims, too), of an outer peripheral surface of the hub 3 is provided with a rotation-side flange 6 for supporting and fixing the wheels.

An axially outboard end opening of a space, in which each of rolling elements 4, 4 is mounted between an inner peripheral surface of the outer ring 2 and the outer peripheral surface of the hub 3, is sealed by a seal ring 7. On the other hand, an axially inboard end portion of the outer ring 2 is mounted with a cylindrical bottomed bearing cap 8 to plug the axially inboard end opening of the outer ring 2. The bearing cap 8 has a cap main body 9 made of synthetic resin and having a bottomed cylindrical shape as a whole and a metal ring 10 made of metal plate and mold-fixed to the cap main body 9. The bearing cap 8 has a cylindrical fitting cylinder part 11 and a bottom plate part 12 extending radially inwards from an axially inboard end portion of the fitting cylinder part 11. The metal ring 10 configuring a tip half portion (an axially outboard half portion) of the fitting cylinder part 11 is externally fitted to an outer peripheral surface of the axially inboard end portion of the outer ring 2 by interference fit, so that the bearing cap 8 is mounted to the axially inboard end portion of the outer ring 2 with plugging the axially inboard end opening of the outer ring 2.

A circular ring-shaped encoder 13 configuring the rotating speed detection device is supported and fixed to the axially inboard end portion of the hub 3 concentrically with the hub 3. An S-pole and an N-pole are alternately arranged with an equal pitch on a detected surface (axially inboard surface) of the encoder 13. A sensor holder 14 made of synthetic resin and configuring the rotating speed detection device is supported and fixed to the bottom plate part 12 configuring the bearing cap 8. To this end, a portion, which axially faces a part of the detected surface of the encoder 13, of the bottom plate part 12 is formed with a holder insertion hole 15 axially penetrated and a bolt insertion hole 16 is formed at a portion adjacent to the holder insertion hole 15. A nut 17 is thermally caulked to an opening peripheral edge portion of the bolt insertion hole 16 of the axially outboard surface of the bottom plate part 12. A rod-shaped (cylindrical column or quadrangular column-shaped) holder main body part 18, which configures the sensor holder 14 and a sensor consisting of an IC having a magnetic detection element such as a Hall element and a waveform shaping circuit incorporated therein is embedded in a tip end portion thereof, is inserted in the holder insertion hole 15. Also, a mounting flange part 19 provided at a base end portion of the holder main body part 18 and a bolt 20 inserted in the bolt insertion hole 16 are screwed to the nut 17. Thereby, the sensor holder 14 is supported and fixed to the bearing cap 8.

When using the rolling bearing unit 1 having the rotating speed detection device, the fixed-side flange 5 fixedly provided to the outer peripheral surface of the outer ring 2 is coupled and fixed to the suspension device by a bolt (not shown), and the wheels are fixed to the rotation-side flange 6 fixed to the outer peripheral surface of the hub 3 by a stud bolt provided for the rotation-side flange 6. Thereby, the wheels are rotatably supported to the suspension device. When the wheels are rotated at this state, the S-pole and the N-pole arranged on the detected surface of the encoder 13 alternately pass the vicinity of the sensor held at the tip end portion of the holder main body part 18. As a result, a density of magnetic flux flowing in a detection unit of the sensor changes, so that an output signal thereof is changed. A frequency of the output signal of the sensor, which changes as described above, is proportional to the number of rotations of the wheels. Therefore, when the output signal is transmitted to a controller (not shown), it is possible to appropriately control an ABS (Antilock Brake System) and a TCS (Traction Control System).

According to the first example of the conventional structure as described above, following problems may be caused. That is, since the holder main body part 18 is inserted into the holder insertion hole 15 formed to axially penetrate the bottom plate part 12 configuring the bearing cap 8, foreign matters such as mud slurry may be introduced into an inner space (an axially outboard side of the bottom plate part 12) of the bearing cap 8 through the holder insertion hole 15. Also, since not only the holder insertion hole 15 but also the bolt insertion hole 16 is formed to axially penetrate the bottom plate part 12, the foreign matters may be introduced into the inner space of the bearing cap 8 through both the holes 15, 16 at a state before the sensor holder 14 is supported and fixed to the bearing cap 8.

Considering the above situation, Patent Document 2 discloses a bearing cap 8a having a structure as shown in FIGS. 11 and 12. The bearing cap 8a of a second example of the conventional structure is configured by a cap main body 9a made of synthetic resin and having a bottomed cylindrical shape as a whole, and a metal ring 10a and a nut 17a made of metal plate and mold-fixed to the cap main body 9a, and has a cylindrical fitting cylinder part 11a and a bottom plate part 12a extending radially inwards from an axially inboard end portion of the fitting cylinder part 11a. The bottom plate part 12a is formed with a bottomed holder insertion hole 15a, which is provided so as to insert therein a tip end portion of a holder main body part 18a configuring a sensor holder 14a and of which only an axially inboard surface is opened. Around the holder insertion hole 15a, a cylindrical holder support part 21 is provided so as to support an outer peripheral surface of an intermediate portion of the holder main body part 18a without rattling at a state where it protrudes axially inwards from an axially inboard surface of the bottom plate part 12a. By the holder support part 21 and the holder insertion hole 15a, the sensor (embedded in the tip end portion of the holder main body part 18a) is positioned via the holder main body part 18a. The nut 17a is kept at a portion, which is adjacent to the holder insertion hole 15a, of the bottom plate part 12a by insert molding.

According to the second example of the conventional structure having the above configuration, the holder insertion hole 15a is configured as a bottomed hole that does not axially penetrate the bottom plate part 12a. For this reason, it is possible to prevent the foreign matters such as mud slurry from being introduced into the bearing cap 8a through the holder insertion hole 15a. Also, since the portion at which the nut 17a is provided does not axially penetrate the bottom plate part 12a, it is possible to prevent the introduction of the foreign matters.

However, according to the second example of the conventional structure, it is difficult to effectively discharge the foreign matters introduced into the holder insertion hole 15a or the holder support part 21.

That is, according to the second example of the conventional structure, a sectional shape (contour shape) of an inner peripheral surface of the holder support part 21 is formed to have a shape (petal shape) where gaps 22, 22 having a substantially semicircular shape are formed at four places in a circumferential direction around the holder main body part 18a when the holder main body part 18a is inserted into the holder support part 21, not a circular shape matched with a shape of an outer peripheral surface of the holder main body part 18a. Thereby, the foreign matters introduced into the holder insertion hole 15a or the holder support part 21 are discharged to an outside by using the respective gaps 22, 22. However, since all of the gaps 22, 22 have an axially long shape of which only an axial inside is opened, it is difficult to completely discharge the foreign matters through the respective gaps 22, 22. Therefore, only moisture is discharged, so that the mud may be deposited inside. The mud deposited inside and freezing of the moisture remaining inside may damage the tip end portion of the holder main body part 18a or a bottom of the holder insertion hole 15a.

CITATION LIST

Patent Documents

Patent Document 1: Japanese Patent Application Publication No. Hei 11-142424A
Patent Document 2: International Publication No. WO2014/044261A

SUMMARY OF THE INVENTION

Problems To Be Solved

The present invention has been made in view of the above situations, and an object thereof is to implement a structure of a bearing cap having a sensor unit capable of effectively discharging foreign matters introduced into a holder support part.

Means For Solving Problems

The present invention provides a bearing cap having a sensor unit and a rolling bearing unit. The bearing cap having a sensor unit includes a bearing cap and a sensor unit.

The bearing cap is mounted to an axially inboard end portion of an outer ring with plugging the axially inboard end opening of the outer ring configured to rotatably support a hub having an encoder supported to an axially inboard end portion thereof towards an inner diameter-side via a plurality of rolling elements.

Also, the sensor unit includes a sensor and a sensor holder supported and fixed to the bearing cap with holding the sensor.

Also, the bearing cap has a fitting cylinder part having a bottomed cylindrical shape as a whole and fitted and fixed to the axially inboard end portion of the outer ring and a bottom plate part extending radially inwards from an axial portion (for example, an axially inboard end portion) of the fitting cylinder part, and at least the bottom plate part is made by injection molding of synthetic resin.

Also, the bottom plate part is provided with a holder support part at a position axially facing a part of the encoder, which is an upper position of two positions adjacent to each other in an upper and lower direction at a using state, and is also provided with a nut holding part at a lower position of the two positions. The holder support part and the nut holding part are spaced from each other with protruding axially inwards from an axially inboard surface of the bottom plate part.

Also, the holder support part has a notched cylinder shape having a discontinuous part at one place in a circumferential direction (for example, a notched cylinder shape), and the discontinuous part is arranged at a lower part (for example, a central part of a lower end portion in a width direction (corresponding to a front and rear direction at a mounted state to a vehicle)) at the using state.

Also, the nut holding part is configured to hold a nut at an inner diameter-side thereof, and an upper surface, which faces a lower surface of the holder support part at the using state, of an outer peripheral surface thereof is configured as a convex curved surface (for example, a cylindrical surface) of which a part facing the discontinuous part is positioned at the uppermost part.

Also, the sensor holder is provided with a holder main body part holding the sensor at an axially outboard end portion inserted into the holder support part and an mounting flange part, which is provided at a portion of the holder main body part protruding axially inwards from an inside of the holder support part and is configured to bring an axially outboard surface into contact with at least an axially inboard end face of the nut holding part of an axially inboard end face of the holder support part and the axially inboard end face of the nut holding part.

Also, the sensor holder is supported and fixed to the bearing cap by screwing a male screw part of a bolt axially inserted (penetrating) into the mounting flange part to the nut.

When implementing the bearing cap having a sensor unit of the present invention, additionally, the axially inboard end face of the nut holding part may be arranged at an inboard side, in the axial direction, of the axially inboard end face of the holder support part, and the axially outboard surface of the mounting flange part may be in contact with only the axially inboard end face of the nut holding part of the axially inboard end face of the holder support part and the axially inboard end face of the nut holding part.

Also, when implementing the bearing cap having a sensor unit of the present invention, additionally, a thickness dimension of a gap between the axially outboard surface of the mounting flange part and the axially inboard end face of the holder support part may be set smaller than a thickness dimension of a gap between an inner peripheral surface of the holder support part and an outer peripheral surface of the holder main body part.

Also, when implementing the bearing cap having a sensor unit of the present invention, additionally, a portion of the bottom plate part, which axially gets alignment with an inner diameter-side part of the holder support part, may be formed with a bottomed sensor insertion hole, which is configured to open towards only the axially inboard surface of the bottom plate part and to communicate with the inner diameter-side part of the holder support part, and an axially outboard end portion of the holder main body part may be inserted into the sensor insertion hole.

Also, when implementing the bearing cap having a sensor unit of the present invention, additionally, the discontinuous part is arranged at a central portion of a lower end portion of the holder support part in the width direction at the using state, and an upper surface of the nut holding part is configured as a cylindrical surface. Also, when an inclined angle of a common tangential line of an end portion of the discontinuous part at one side (or the other side) in the width direction and the upper surface of the nut holding part relative to a horizontal line in a virtual plane orthogonal to the axial direction is denoted as $\alpha$ and an inclined angle of a common tangential line of an end portion of the discontinuous part at the other opposite side in the width direction and the upper surface of the nut holding part relative to the horizontal line is denoted as $\beta$, the inclined angles $\alpha$, $\beta$ may be constrained to a range of $50° \leq \alpha \leq 60°$ and $0° < \beta \leq 10°$ (preferably, $53° \leq \alpha \leq 57°$ and $3° < \beta \leq 7°$.

In the meantime, the rolling bearing unit of the present invention is to rotatably support wheels (non-driven wheels) of an automobile and includes an outer ring, a hub, a plurality of rolling elements, an encoder, a bearing cap and a sensor unit.

The outer ring has a single-row or a double-row outer raceway on an inner peripheral surface thereof.

Also, the hub has a single-row or a double-row inner raceway on an outer peripheral surface thereof and is configured to rotate upon using.

Also, each rolling element is provided to be freely rollable between the outer raceway and the inner raceway. As the rolling element, a ball, a conical roller, a cylindrical roller, a spherical roller, a needle or the like can be used.

Also, the encoder is supported and fixed to an axially inboard end portion of the hub, concentrically with the hub, and characteristics thereof are changed alternately and at an equal pitch in a circumferential direction.

Also, the bearing cap is mounted to an axially inboard end portion of the outer ring with plugging the axially inboard end opening of the outer ring.

Also, the sensor unit is supported and fixed to the bearing cap.

In particular, the rolling bearing unit of the present invention uses, as a bearing cap having a sensor unit with the sensor unit being supported and fixed to the bearing cap, the above-described bearing cap having a sensor unit.

Effects of the Invention

According to the bearing cap having a sensor unit and the rolling bearing unit of the present invention configured as described above, it is possible to effectively discharge the foreign matters introduced into the holder support part of the bottom plate part configuring the bearing cap.

That is, according to the present invention, the discontinuous part is provided at one place of the holder support part in the circumferential direction and is arranged at the lower part. For this reason, even when the foreign matters such as mud slurry are introduced from n outside into the holder support part through a part between the axially inboard end face of the holder support part and the axially outboard surface of the mounting flange part configuring the sensor holder, it is possible to effectively discharge the foreign matters through the discontinuous part by using a gravity action.

Also, according to the present invention, the upper surface of the nut holding part faces the lower surface of the holder support part, and the upper surface of the nut holding part is configured as the convex curved surface of which a part facing the discontinuous part is positioned at the uppermost part. Thereby, a width dimension in the upper and lower direction between the lower surface of the holder support part (and the lower surface of the holder main body part exposed through the discontinuous part and configuring the sensor holder) and the upper surface of the nut holding part is reduced at a central part (a part corresponding to the discontinuous part) in the width direction. For this reason, upon the using (for example, upon travel of the automobile), when an air stream is generated in the width direction (front and rear direction) therebetween, the air stream forms a flow of an upwardly convex circular arc shape along the upper surface of the nut holding part and is introduced into the central part in the width direction therebetween with increasing a speed thereof. As the air stream of which the speed has increased is introduced, the central part in the width direction becomes a negative pressure. As a result, it is possible to improve the effect of discharging the foreign matters through the discontinuous part at the central part therebetween in the width direction by an effect of the flow of an upwardly convex circular arc shape (an effect that the air stream passes an inner side of the discontinuous part) and a Venturi effect (an effect of pulling a fluid based on a negative pressure).

Also, according to the present invention, the upper surface of the nut holding part faces the discontinuous part of the holder support part. For this reason, it is possible to protect the discontinuous part from the mud slurry bounced out of a road surface by the nut holding part. Therefore, it is possible to effectively prevent the mud slurry from being introduced into the holder support part through the discontinuous part.

Also, according to the present invention, the upper surface of the nut holding part is configured as the convex curved surface of which a part facing the discontinuous part of the holder support part is positioned at the uppermost part. For this reason, even when the upper surface of the nut holding part is brought into close to a part, which is exposed to the outside through the discontinuous part, of the outer peripheral surface of the holder main body part so as to cause the Venturi effect, it is easy to secure a facing interval between the upper surface of the nut holding part and both end portions of the holder support part in the circumferential direction, (as compared to a configuration where the upper surface of the nut holding part is configured as a flat surface parallel in the width direction). Therefore, it is easy to secure a thickness of a part, which is positioned between the upper surface of the nut holding part and both end portions of the holder support part in the circumferential direction, of a mold for injection molding to be used when injection molding the bottom plate part of the bearing cap. As a result, it is possible to avoid a problem, which is to occur when the thickness is small.

DETAILED DESCRIPTION OF EMBODIMENTS

First Example of Embodiment

Figure 1:
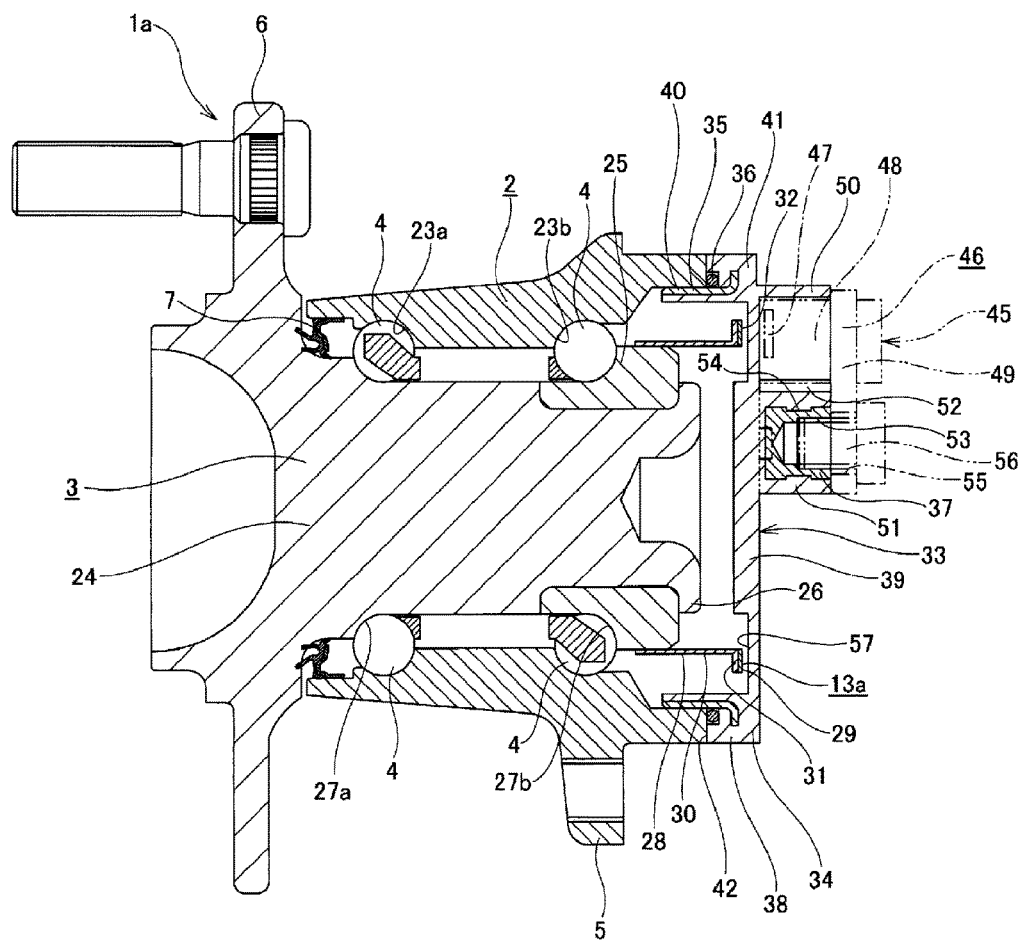
FIG. 1 is a sectional view of a rolling bearing unit including a rotating speed detection device, depicting a first example of an embodiment of the present invention.

A first example of an embodiment of the present invention will be described with reference to FIGS. 1 to 4. A feature of the first example is a structure of a bearing cap having a sensor unit configured by combining a bearing cap 33 for plugging an axially inboard end opening of an outer ring 2 and a sensor unit 45 of which a sensor 47 is held at a sensor holder 46. Since the configurations of the other parts and the operational effects are basically the same as the above-described conventional structure, the feature of the first example and parts, which have not been described in the above, are described in the below.

A rolling bearing unit 1a having a rotating speed detection device of the first example is configured to rotatably support wheels, which are non-driven wheels, to a suspension device such as a knuckle and the like and to detect a rotating speed of the wheels. The rolling bearing unit 1a is configured to rotatably support a hub 3, which is a rotational ring, to an inner diameter-side of an outer ring 2, which is a stationary ring, via a plurality of rolling elements 4, 4.

The outer ring 2 has a fixed-side flange 5 for coupling and fixing to a knuckle (not shown), which configures the suspension device, on an outer peripheral surface thereof, and also has outer raceways 23a, 23b of a double-row on an inner peripheral surface thereof. The hub 3 includes a hub main body 24 and an inner ring 25 coupled and fixed by a caulking part 26, has inner raceways 27a, 27b of a double-row on an outer peripheral surface thereof, and is supported to an inner diameter-side of the outer ring 2 concentrically with the outer ring 2. A portion, which more protrudes axially outwards than an axially outboard end opening of the outer ring 2, of an axially outboard end portion of the hub main body 24 is provided with a rotation-side flange 6 for supporting the wheels. The plurality of rolling elements 4, 4 is provided between the respective outer raceways 23a, 23b and the respective inner raceways 27a, 27b, respectively. In the shown example, as the rolling elements 4, 4, balls are used. However, a conical roller may also be used in a rolling bearing unit for an automobile having a greater weight.

The outer ring 2 and the hub main body 24 configuring the hub 3 are made of medium carbon steel such as S53C (JIS (Japanese Industrial Standard) G 4051:2005), and at least surfaces of the respective raceways 23a, 23b, 27a have been subjected to hardening treatment, such as high-frequency hardening. On the other hand, the inner ring 25 configuring the hub 3 and each of the rolling elements 4, 4 are made of high carbon chromium bearing steel such as SUJ2 (JIS G 4051:2005), and have been subjected to hardening treatment, such as immersion quenching.

A circular ring-shaped encoder 13a configuring the rotating speed detection device is supported and fixed to an axially inboard end portion of the inner ring 25 configuring the hub 3, concentrically with the hub 3. The encoder 13a includes a support ring 28 and an encoder main body 29. The support ring 28 is formed to have a circular ring shape having an L-shaped section by stamping a ferrite-based stainless steel plate such as SUS430 (JIS G 4305:2010) or a rolled steel plate such as SPCC (JIS G 3141:2009). The support ring 28 has a support cylindrical part 30 and a support circular ring part 31 bent radially outwards from an axially inboard end portion of the support cylindrical part 30. An axially outboard end portion of the support cylindrical part 30 is externally fitted and fixed to the axially inboard end portion of the inner ring 25 by interference fit.

The encoder main body 29 has a circular ring shape as a whole made by a permanent magnet such as a rubber magnet, a plastic magnet or the like having magnetic body such as ferrite powders mixed therein, and is bonded and fixed to an axially inboard surface of the support circular ring part 31. An S-pole and an N-pole are alternately arranged at an equal pitch in the circumferential direction on a detected surface 32, which is an axially inboard surface of the encoder main body 29. The detected surface 32 is arranged concentrically with the hub 3 at an inboard side, in an axial direction, of an axially inboard end face of the caulking part 26 formed at an axially inboard end portion of the hub main body 24.

An axially outboard end opening of a space in which the rolling elements 4, 4 are provided between the inner peripheral surface of the outer ring 2 and the outer peripheral surface of the hub 3 is sealed by a seal ring 7. In contrast, an axially inboard end portion of the outer ring 2 is mounted with a bottomed cylindrical bearing cap 33, so that the axially inboard end opening of the outer ring 2 is plugged. The sensor unit 45, which configures the rotating speed detection device, is supported and fixed to the bearing cap 33 at a using state.

The sensor unit 45 includes a sensor holder 46 made of synthetic resin and a sensor 47. The sensor holder 46 has a cylindrical column-shaped (rod-shaped) holder main body part 48 and an mounting flange part 49 provided at a part close to a base end (an axially inboard end, a right end in FIGS. 1 and 2) of the holder main body part 48. The sensor 47 is an IC in which a magnetic detection element such as a Hall IC, a Hall device, an MR device (Magneto Resistive Device), a GMR device (Giant Magneto Resistive Device)

or the like and a waveform shaping circuit are incorporated, and is mold-fixed (embedded) to a tip end portion (axially outboard end portion) of the holder main body part 48.

The bearing cap 33 has a cap main body 34 made of synthetic resin and having a bottomed cylindrical shape, a metal ring 35 and a nut 37 mold-fixed to the cap main body 34, and an O-ring 36. The bearing cap 33 has a substantially cylindrical fitting cylinder part 38 and a bottom plate part 39 having a substantially circular plate shape and extending radially inwards from an axially inboard end portion of an axial portion of the fitting cylinder part 38 (with plugging an axially inboard end opening of the fitting cylinder part 38).

The cap main body 34 is made by injection-molding a fiber reinforced polyamide resin material in which glass fiber is appropriately added to polyamide 66 resin, for example. If required, amorphous aromatic polyamide resin (modified polyamide 6T/6I) and low water-absorption aliphatic polyamide resin (polyamide 11 resin, polyamide 12 resin, polyamide 610 resin, polyamide 612 resin) may be appropriately added to the polyamide resin so as to further improve water resistance. In the first example, the metal ring 35 and the nut 37 are mold-fixed upon the injection molding of the cap main body 34, so that they are fixed to the cap main body 34.

The fitting cylinder part 38 configuring the bearing cap 33 has a stepped cylindrical shape where a small diameter cylinder part 40 provided at a tip half part (an axially outboard half part, a left half part in FIGS. 1 and 2) and a large diameter cylinder part 41 provided at a base half part (an axially inboard half part, a right half part in FIGS. 1 and 2) are continued by a step surface 42. In the first example, an outer diameter-side part of the small diameter cylinder part 40 is configured by a metal ring 35. The metal ring 35 is made of a stainless steel plate, a rolled steel plate or the like, has an L-shaped section, and includes a cylindrical part 43 and an outwardly facing flange part 44 bent radially outwards from an axially inboard end portion of the cylindrical part 43. While most of the cylindrical part 43 except for the axially inboard end portion is exposed to an outer peripheral surface of the small diameter cylinder part 40, the outwardly facing flange part 44 is entirely embedded in the large diameter cylinder part 41. An inner diameter-side part of the step surface 42 is configured as an engaging groove for the O-ring 36, and the O-ring 36 is engaged with the engaging groove.

The bottom plate part 39 has a substantially circular plate shape, as a whole. The bottom plate part 39 is provided with a holder support part 50 and a nut holding part 51 at two positions adjacent to each other in the upper and lower direction of a central part of an upper half part in the width direction (a front and rear direction at a mounted state to a vehicle, a front and back direction in FIGS. 1 and 2, a right and left direction in FIGS. 3 and 4) at a using state. More specifically, the holder support part 50 is provided at a position axially facing a part of the detected surface 32 of the encoder 13a, which is an upper position of the two positions, and the nut holding part 51 is provided at a lower position of the two positions. The holder support part 50 and the nut holding part 51 protrude axially inwards from an axially inboard surface of the bottom plate part 39 and are spaced from each other.

The holder support part 50 has a notched cylindrical shape (a substantially C-shaped sectional shape) having a discontinuous part 52 at one place in a circumferential direction, and the discontinuous part 52 is arranged at a lower end portion (a central portion of a lower part in the width direction) at the using state. An inner diameter-side part of the holder support part 50 is a bottomed cylindrical column-shaped hole of which only an axially inboard end portion is opened and only a part corresponding to the discontinuous part 52 in the radial direction is opened. The holder support part 50 configured as described above is provided so as to internally fit thereto a tip end portion and an intermediate portion of the holder main body part 48 configuring the sensor holder 46 without rattling, and has an inner diameter dimension slightly greater than outer diameter dimensions of the tip end portion and the intermediate portion of the holder main body part 48.

The nut holding part 51 has a cylindrical shape, and a nut 37 is mold-fixed to an inner diameter-side thereof by insert molding. The nut 37 is a bottomed cylindrical cap nut having a bottom provided at an axially outboard end portion thereof, a female screw part 53 is formed on an inner peripheral surface, and an engaging concave groove 54 is formed at one or more axial places (one place, in the shown example). A part of the synthetic resin configuring the nut holding part 51 is enabled to enter the engaging concave groove 54. An axially inboard end face of the nut holding part 51 and an axially inboard end face of the nut 37 are positioned on the same virtual plane as an axially inboard end face of the holder support part 50. In the first example, a part, which is adjacent to one side (a left side in FIGS. 3 and 4) of the nut holding part 51 in the width direction, of the axially inboard surface of the bottom plate part 39 is provided with a convex portion 59 having a substantially semi-elliptical shape. A substantially central portion of an axially inboard surface of the convex portion 59 is formed with a circle-shaped concave portion, which is an injection port (gate) of the synthetic resin upon the injection molding of the cap main body 34.

In the first example, the nut 37 has a structure (a cap nut) that is not perforated in the axial direction. Therefore, upon the insert molding, it is not necessary to screw the nut 37 with the male screw part, so that it is possible to improve the operability of the insert molding. On the other hand, when the nut has a structure that is perforated in the axial direction, the insert molding is performed with the nut being screwed with the male screw part so that the synthetic resin is not to be introduced into the nut. The method of fixing the nut 37 is not limited to the insert molding. For example, a variety of methods known in the related art, such as press fitting, can be adopted.

In the first example, the outer peripheral surface (except for the lower end portion corresponding to the discontinuous part 52) of the holder support part 50 and the outer peripheral surface of the nut holding part 51 are respectively cylindrical surfaces and central axes thereof are located at the same vertical line. For this reason, a lower surface of the outer peripheral surface (except for the lower end portion corresponding to the discontinuous part 52) of the holder support part 50 and an upper surface of the outer peripheral surface of the nut holding part 51, which face each other in the upper and lower direction, are configured as cylindrical surfaces convex towards each other in the upper and lower direction. In particular, the upper surface of the nut holding part 51 is an upwardly convex cylindrical surface of which a part facing the discontinuous part 52 is positioned at the uppermost part. In the first example, the outer peripheral surface of the holder support part 50 and the outer peripheral surface of the nut holding part 51 do not overlap with each other in the width direction, and when both the circumferential surfaces are seen in the width direction, a slight gap is formed in the upper and lower direction between both the circumferential surfaces.

In the first example, when an inclined angle of a common tangential line of an end portion of the discontinuous part 52 at one side (or the other side) in the width direction and the upper surface of the nut holding part 51 relative to a horizontal line in a virtual plane (a sheet surface of FIG. 3) orthogonal to the axial direction is denoted as $\alpha$ and an inclined angle of a common tangential line of an end portion of the discontinuous part 52 at the other opposite side in the width direction and the upper surface of the nut holding part 51 relative to the horizontal line is denoted as $\beta$, the inclined angles $\alpha$, $\beta$ are set as $\alpha=55°$, $\beta=5°$.

When implementing the present invention, the values of $\alpha$ and $\beta$ are preferably regulated to a predetermined range around the values of the first example, i.e., a range of $50°\leq\alpha\leq60°$ and $0°<\beta\leq10°$, from a standpoint of increasing the effect of discharging the foreign matters through the discontinuous part 52, as described later. Also, the values are more preferably controlled to a range of $53°\leq\alpha\leq57°$ and $3°\leq\beta\leq7°$. The range of the values of $\alpha$ and $\beta$ will be further described later.

The bearing cap 33 of the first example configured as described above is mounted to the axially inboard end portion of the outer ring 2 with plugging the axially inboard end opening of the outer ring 2 by internally fitting and fixing the small diameter cylinder part 40 (the cylindrical part 43) of the fitting cylinder part 38 to the axially inboard end portion of the outer ring 2 by interference fit. At this state, the step surface 42 is butted to the axially inboard end face of the outer ring 2, so that the bearing cap 33 is axially positioned relative to the outer ring 2. Also, the O-ring 36 is elastically compressed between the axially inboard end face of the outer ring 2 and the bottom of the engaging groove having the O-ring 36 engaged thereto, so that both the surfaces thereof are sealed therebetween. An axially outboard surface of a part, at which the holder support part 50 is provided, of the bottom plate part 39 closely faces the detected surface 32 of the encoder 13a.

In the first example, the sensor holder 46 is supported and fixed to the bearing cap 33, as follows. That is, the rod-shaped holder main body part 48 configuring the sensor holder 46 is inserted (internally fitted) into the holder support part 50 without rattling. Also, the axially outboard surface of the mounting flange part 49 provided in the vicinity of the base end of the holder main body part 48 is contacted to the axially inboard end face of the holder support part 50 and the axially inboard end faces of the nut holding part 51 and the nut 37, respectively. At this state, a male screw part provided at a tip end portion of a bolt 56 inserted into a through-hole 55 of the mounting flange part 49 is screwed to the female screw part 53 of the nut 37 and is further tightened. Thereby, the sensor 47 held at the tip end portion of the holder main body part 48 is made to closely face the detected surface 32 of the encoder 13a in the axial direction via the bottom plate part 39.

In the first example, a part, which axially faces the detected surface 32 of the encoder 13a, of the axially outboard surface of the bottom plate part 39 is formed with the annular concave portion 57 over an entire circumference. The detected surface 32 is inserted into the annular concave portion 57 and is enabled to closely face the bottom of the annular concave portion 57. The corresponding configuration is adopted, so that it is possible to shorten an axial facing distance between the detected surface 32 of the encoder 13a and the sensor 47 by an axial depth of the annular concave portion 57, thereby improving an output intensity of the sensor 47.

The rolling bearing unit 1a having the rotating speed detection device in accordance with the first example having the configuration as described above can also rotatably support the wheels, which are non-driven wheels, to the suspension device and detect the rotating speed of the wheels, like the conventional structure. For this reason, it is possible to appropriately control the ABS and TCS.

Particularly, in the first example, it is possible to effectively discharge the foreign matters such as mud slurry introduced into the holder support part 50 provided at the bottom plate part 39 configuring the bearing cap 33.

That is, in the first example, the discontinuous part 52 is provided at one place of the holder support part 50 in the circumferential direction, and the discontinuous part 52 is arranged at the lower end portion of the holder support part 50. For this reason, even when the foreign matters such as mud slurry are introduced into the holder support part 50 from the outside through a part between the axially inboard end face of the holder support part 50 and the axially outboard surface of the mounting flange part 49 configuring the sensor holder 46, it is possible to effectively discharge the foreign matters to the outside through the discontinuous part 52 by using the gravity action.

In the first example, the upper surface of the nut holding part 51 faces the lower surface of the holder support part 50, and the upper surface of the nut holding part 51 is configured as a cylindrical surface of which a part facing the discontinuous part 52 is located at the uppermost part. For this reason, when the foreign matters such as mud slurry discharged through the discontinuous part 52 are dropped to the upper surface of the nut holding part 51, the foreign matters can easily move in the circumferential direction along the upper surface by the gravity action. In other words, the foreign matters are difficult to stay at the dropped position.

In the first example, as described above, the upper surface of the nut holding part 51 faces the lower surface of the holder support part 50, and the upper surface of the nut holding part 51 is configured as a cylindrical surface of which a part facing the discontinuous part 52 is located at the uppermost part. Thereby, a width dimension in the upper and lower direction between the lower surface of the holder support part 50 (and a part, which is exposed outside through the discontinuous part 52, of the outer peripheral surface of the holder main body part 48 configuring the sensor holder 46) and the upper surface of the nut holding part 51 is reduced at a central part (a part corresponding to the discontinuous part 52) in the width direction. For this reason, upon the using (for example, upon travel of the automobile), when an air stream is generated in the width direction (front and rear direction) therebetween, the air stream forms a flow of an upwardly convex circular arc shape along the upper surface of the nut holding part 51 and is introduced into the central part in the width direction therebetween with increasing a speed thereof. As the air stream of which the speed has increased is introduced, the central part in the width direction becomes a negative pressure. As a result, it is possible to improve the effect of discharging the foreign matters through the discontinuous part 52 at the central part therebetween in the width direction by an effect of the flow of an upwardly convex circular arc shape (an effect that the air stream passes an inner side of the discontinuous part 52) and a Venturi effect (an effect of pulling a fluid based on a negative pressure).

In the first example, it is necessary to increase the speed of the air stream at a portion of the discontinuous part 52 (particularly, a central portion of the discontinuous part 52 in the width direction) so as to generate the Venturi effect at the discontinuous part 52. Therefore, it is necessary to form a small gap in the upper and lower direction between the holder support part 50 and the nut holding part 51, as seen in the width direction. For this reason, it is necessary to set the inclined angle β (FIG. 3) greater than 0° (an angle at which the holder support part 50 and the nut holding part 51 are in contact with each other, as seen in the width direction). In the meantime, when the inclined angle β is greater than 10°, the part, which is exposed outside through the discontinuous part 52, of the outer peripheral surface of the holder main body part 48 comes closer to the gap, which hinders the Venturi effect. Therefore, the angle is set to a range of 0°<β≤10°.

Also, in order to form the small gap in the upper and lower direction between the holder support part 50 and the nut holding part 51, as seen in the width direction and to secure a distance between the part, which is exposed outside through the discontinuous part 52, of the outer peripheral surface of the holder main body part 48 and the gap for efficiently generating the Venturi effect, the angle is preferably set to a range of 3°≤β≤7°.

In the meantime, the inclined angle α (FIG. 3) is associated with a ratio as to how much the air stream is to be narrowed by the holder main body part 48 and the holder support part 50. The greater the inclined angle α, the air stream to be introduced from the holder support part 50 into the discontinuous part 52 becomes stronger. At the discontinuous part 52, the air stream of the slightly upwardly convex shape preferably flows without colliding with the part, which is exposed outside through the discontinuous part 52, of the outer peripheral surface of the holder main body part 48. Regarding this, when the inclined angle α is greater than 60°, the air stream starts to collide with the part, which is exposed outside through the discontinuous part 52, of the outer peripheral surface of the holder main body part 48. Also, when the inclined angle α is smaller than 50°, the air stream at the discontinuous part 52 does not flow in the upwardly convex shape. Therefore, it is necessary to set the angel to a range of 50°≤α≤60°. Also, a range of 53°≤α≤57° is preferable because the air stream of the upwardly convex shape is stably obtained.

Figure 5:
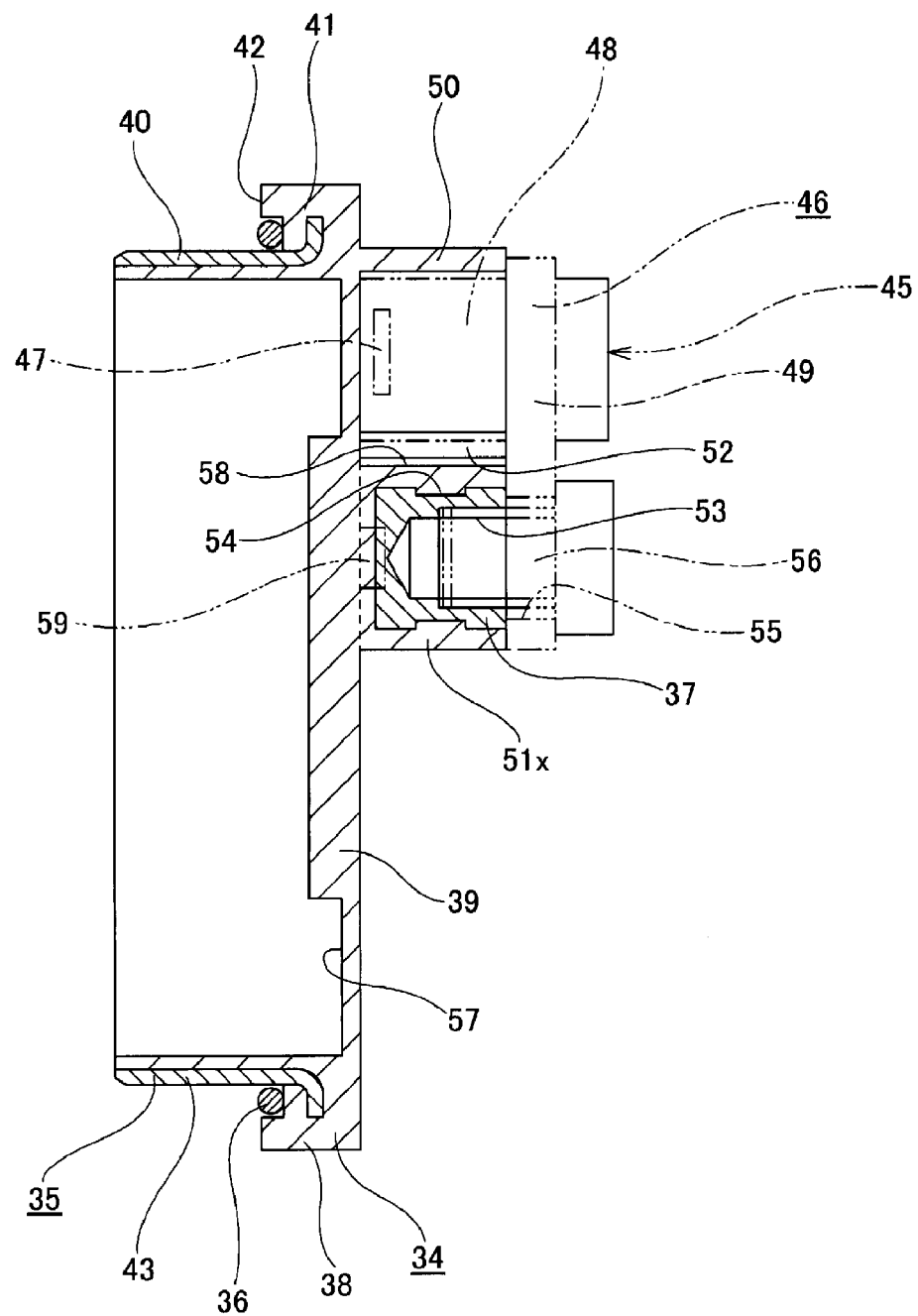
FIG. 5 is a sectional view similar to FIG. 2, depicting a first example of a reference example relating to the present invention.
Figure 6:
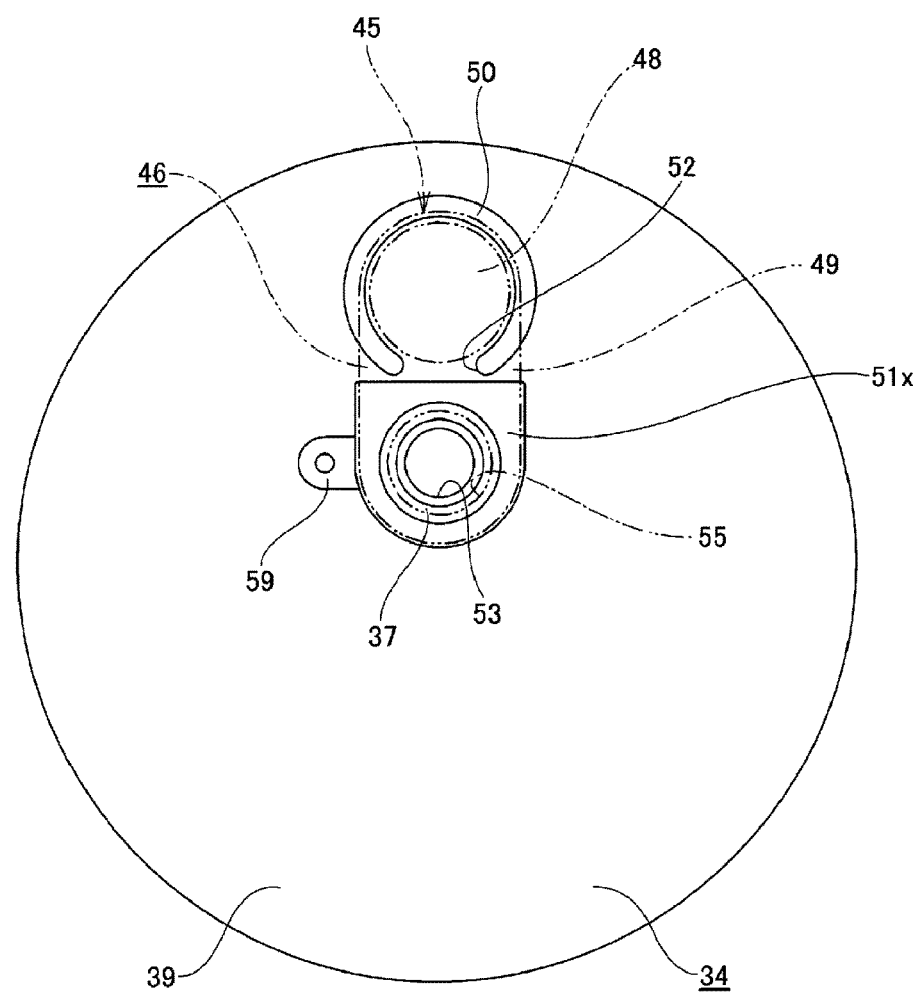
FIG. 6 is an end face view equivalent to FIG. 3.
Figure 7:
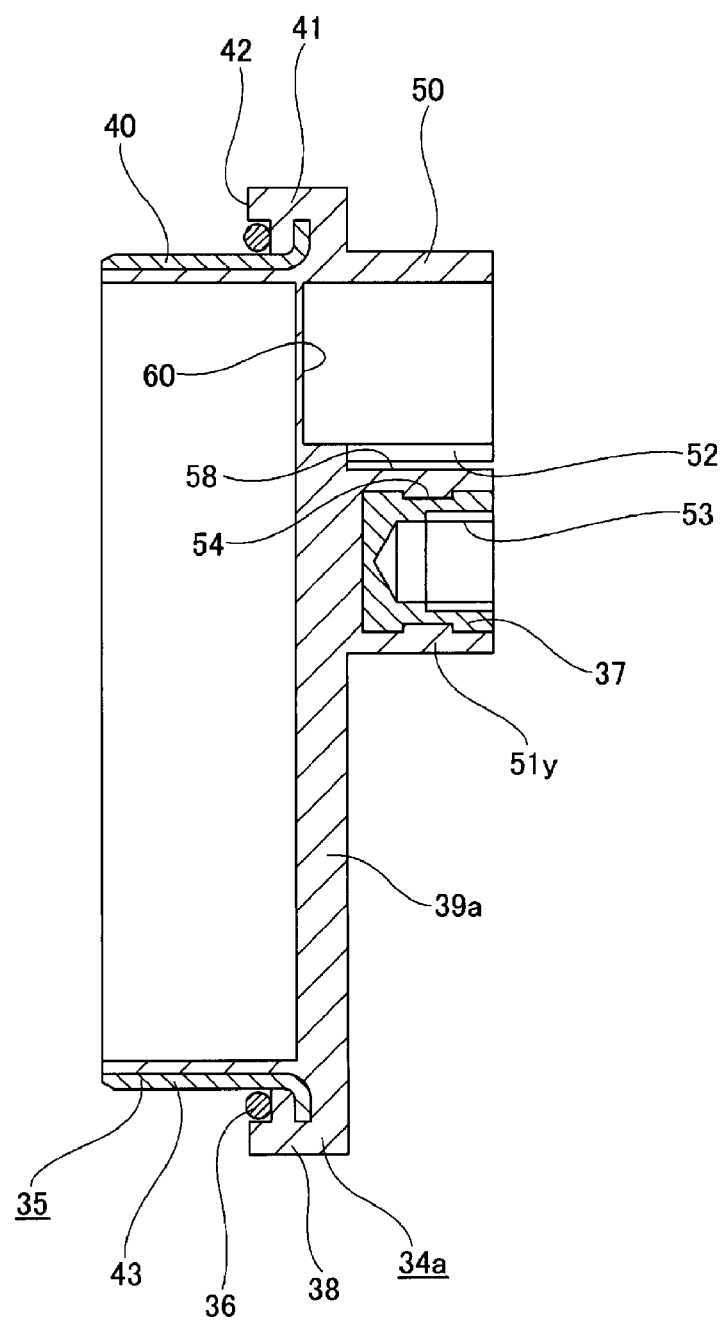
FIG. 7 is a sectional view similar to FIG. 2, depicting a second example of the reference example relating to the present invention.
Figure 8:
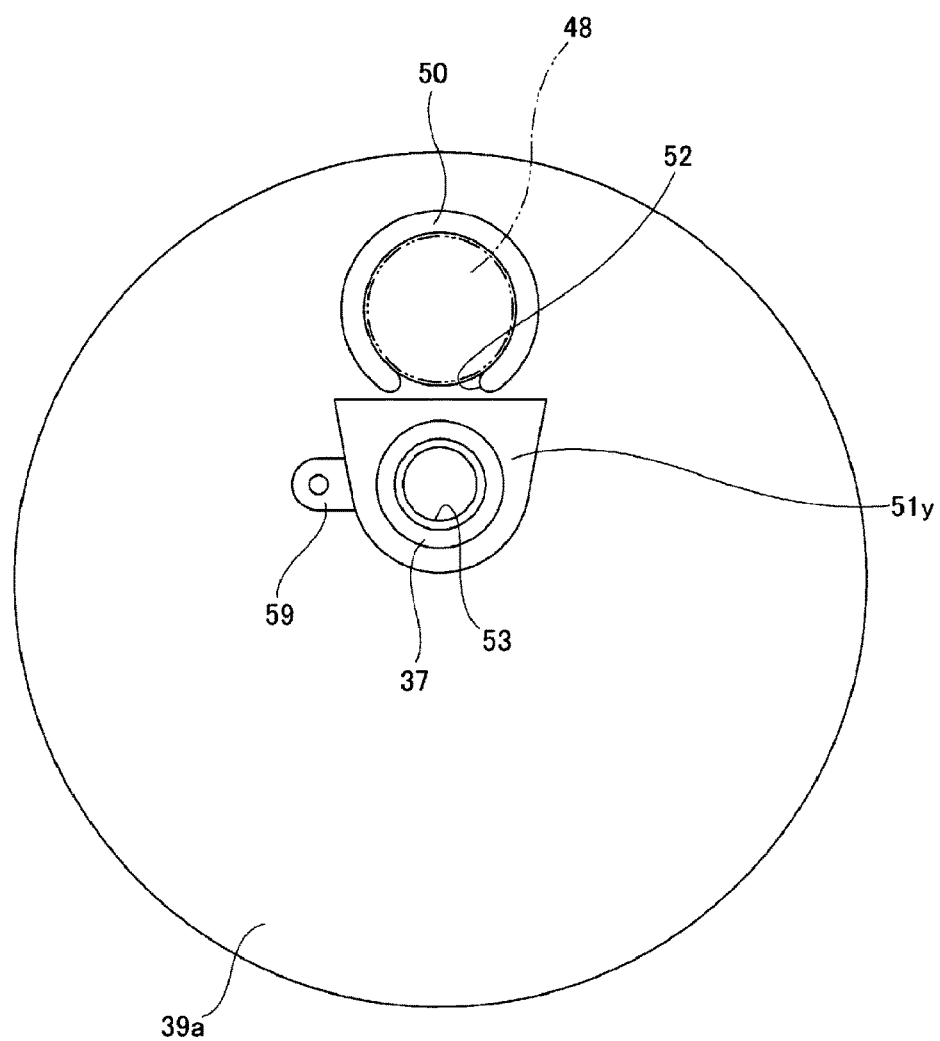
FIG. 8 is an end face view equivalent to FIG. 3.

Like a first example of a reference example relating to the present invention shown in FIGS. 5 and 6 and a second example of the reference example relating to the present invention shown in FIGS. 7 and 8, in a structure where an upper surface of a nut holding part 51x (51y) is configured as a flat surface 58 parallel in the width direction (contrary of the structure where the upper surface of the nut holding part 51 is configured as a cylindrical surface of which a part facing the discontinuous part 52 is located at the uppermost part, like the first example), it is difficult for an upper surface of the nut holding part 51x (51y) to sufficiently come close to the part, which is exposed outside through the discontinuous part 52 of the holder support part 50, of the outer peripheral surface of the holder main body part 48.

For this reason, in the first and second examples of the reference example, a width dimension in the upper and lower direction between the part, which is exposed outside through the discontinuous part 52, of the outer peripheral surface of the holder main body part 48 and the upper surface of the nut holding part 51x (51y) increases, so that when an air stream in the width direction is generated, the speed of the air stream is likely to decrease therebetween. Therefore, when water is introduced therebetween with riding on the air stream in the width direction, the water may be easily collected therebetween. In contrast, according to the first example, since it is possible to bring the upper surface of the nut holding part 51 into sufficiently close to the part, which is exposed outside through the discontinuous part 52 of the holder support part 50, of the outer peripheral surface of the holder main body part 48, it is possible to avoid the corresponding problem.

In the first example, the upper surface of the nut holding part 51 faces the discontinuous part 52 of the holder support part 50. For this reason, it is possible to protect the discontinuous part 52 from the mud slurry bounced out of a road surface by the nut holding part 51. Therefore, it is possible to effectively prevent the mud slurry from being introduced into the holder support part 50 through the discontinuous part 52.

In the first example, the upper surface of the nut holding part 51 is configured as a cylindrical surface of which a part facing the discontinuous part 52 of the holder support part 50 is located at the uppermost part. For this reason, even when the upper surface of the nut holding part 51 is brought into close to the lower surface of the holder main body part 48 exposed outside through the discontinuous part 52 so as to generate the Venturi effect, it is possible to easily secure a facing interval between the upper surface of the nut holding part 51 and both end portions of the holder support part 50 in the circumferential direction (as compared to the structure where the upper surface of the nut holding part 51x (51y) is configured as the flat surface 58 parallel in the width direction, like the first example of the reference example relating to the present invention shown in FIGS. 5 and 6 and the second example of the reference example relating to the present invention shown in FIGS. 7 and 8). Therefore, it is easy to secure a thickness of a part, which is positioned between the upper surface of the nut holding part 51 and both end portions of the holder support part 50 in the circumferential direction, of a mold for injection molding to be used when injection molding the bottom plate part 39 of the bearing cap 33.

As a result, it is possible to prevent a problem, which is to occur when the thickness is small. As the problem, a problem that it is difficult to manufacture and control a mold for injection molding, a problem that the completed bottom plate part 39 is to be shrunk or deformed or an injection molding cycle is to be lengthened on the basis of deformation of the thickness-reduced part due to a pressure upon the injection molding or on the basis of delay in solidification of resin at a surrounding part of the thickness-reduced part due to a small heat capacity of the thickness-reduced part, and the like may be exemplified.

Second Example of Embodiment

Figure 9:
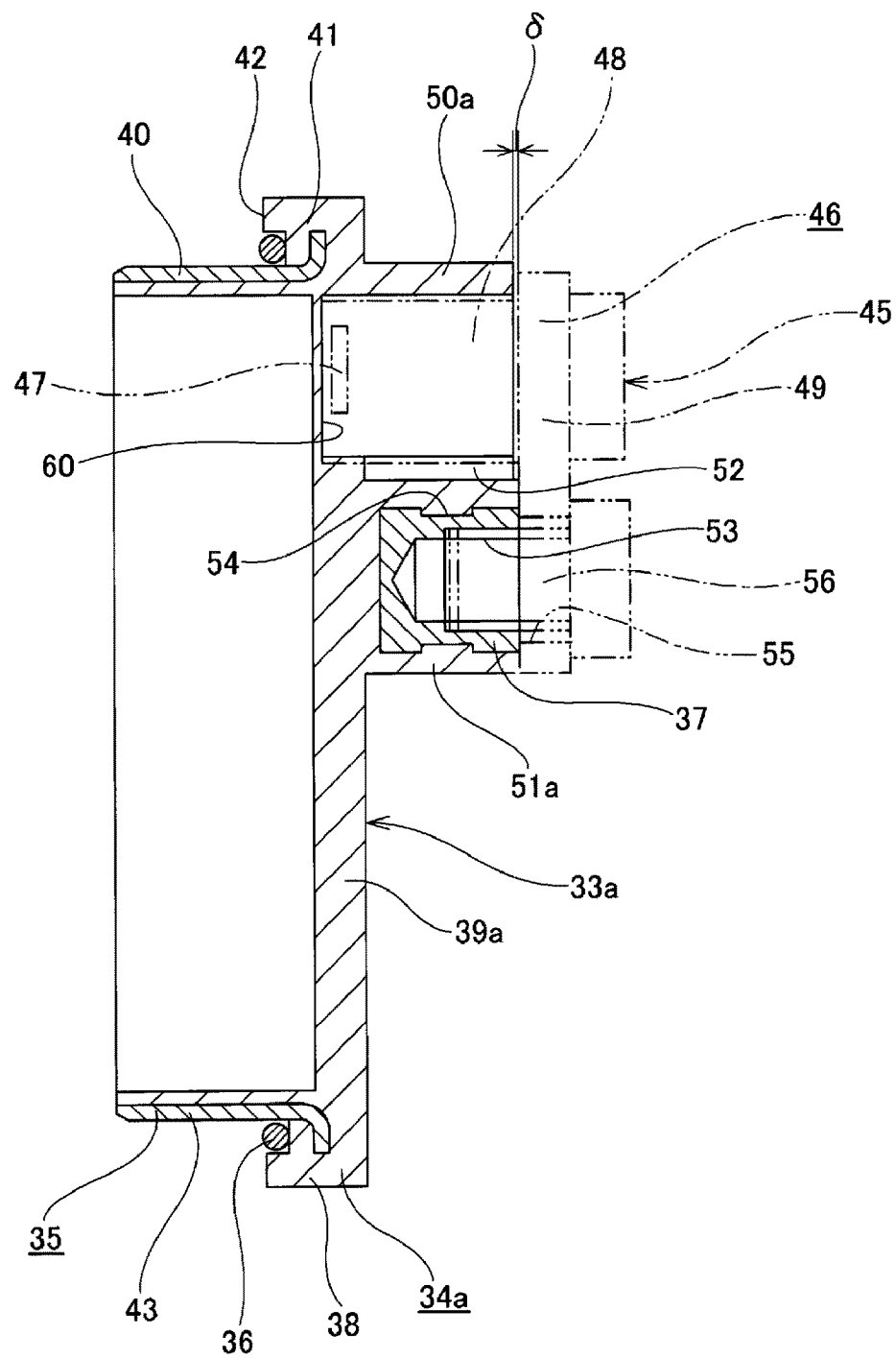
FIG. 9 is a sectional view equivalent to FIG. 2, depicting a second example of the embodiment of the present invention.
Figure 10:
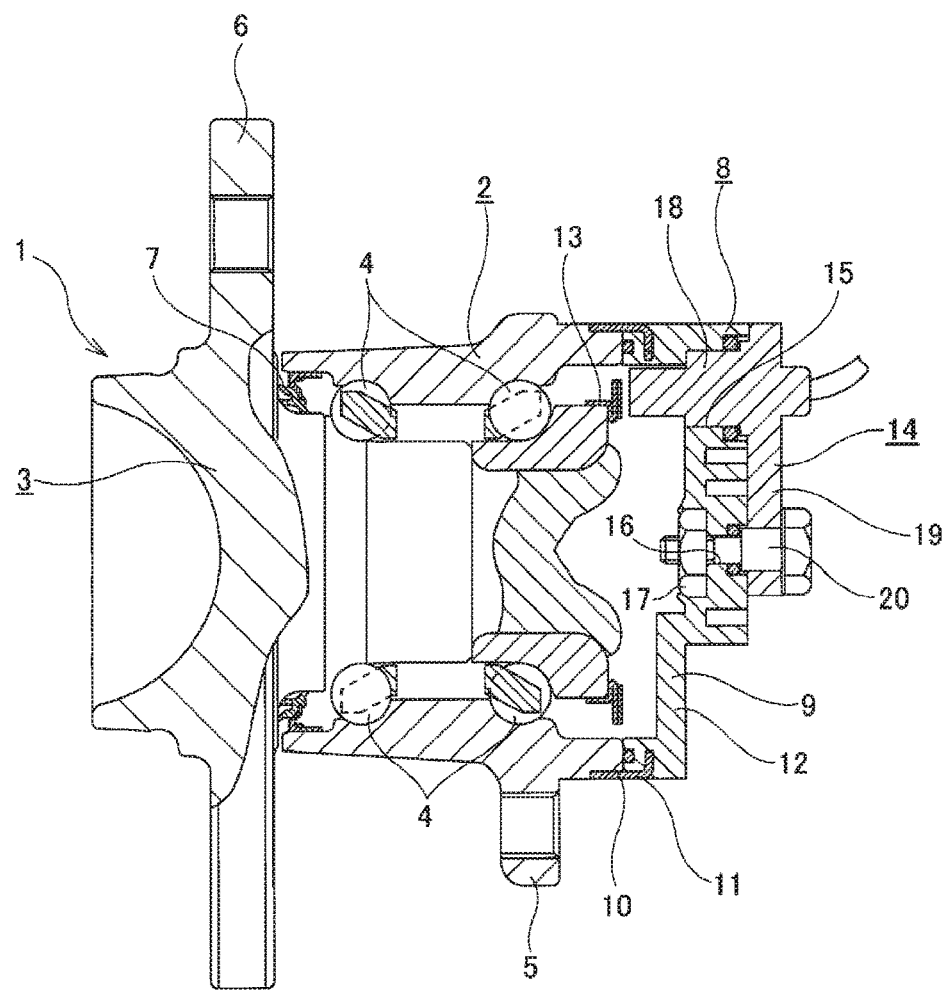
FIG. 10 is a sectional view depicting a rolling bearing unit including a rotating speed detection device of a first example of the conventional structure.
Figure 11:
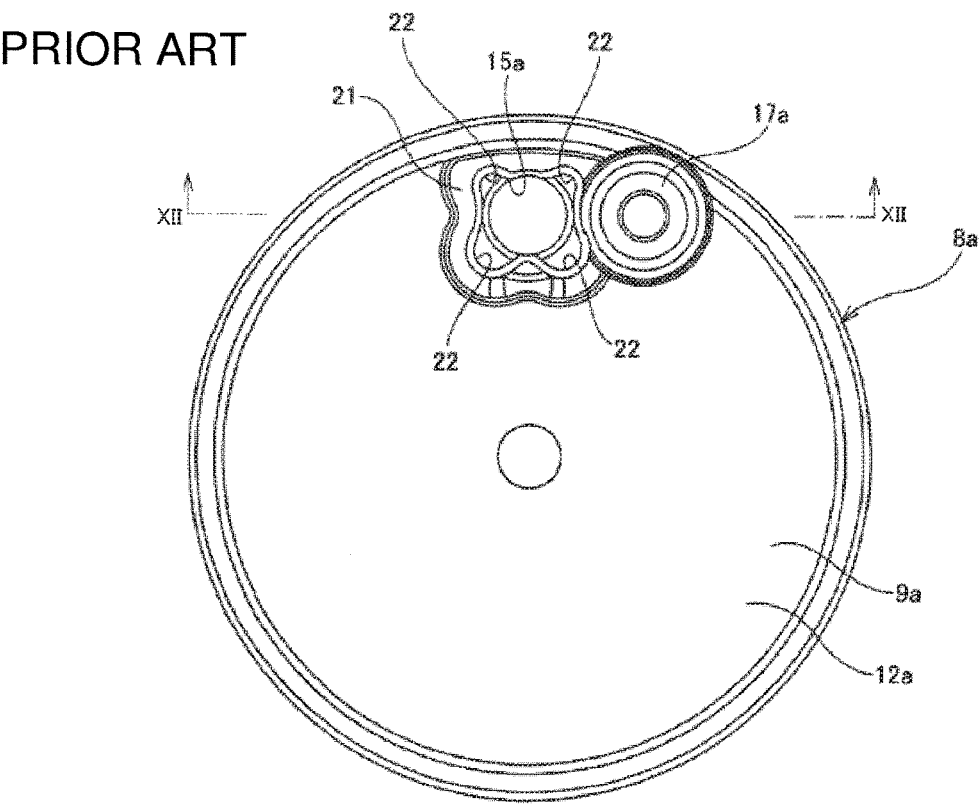
FIG. 11 is an end face view depicting a bearing cap of a second example of the conventional structure.
Figure 12:
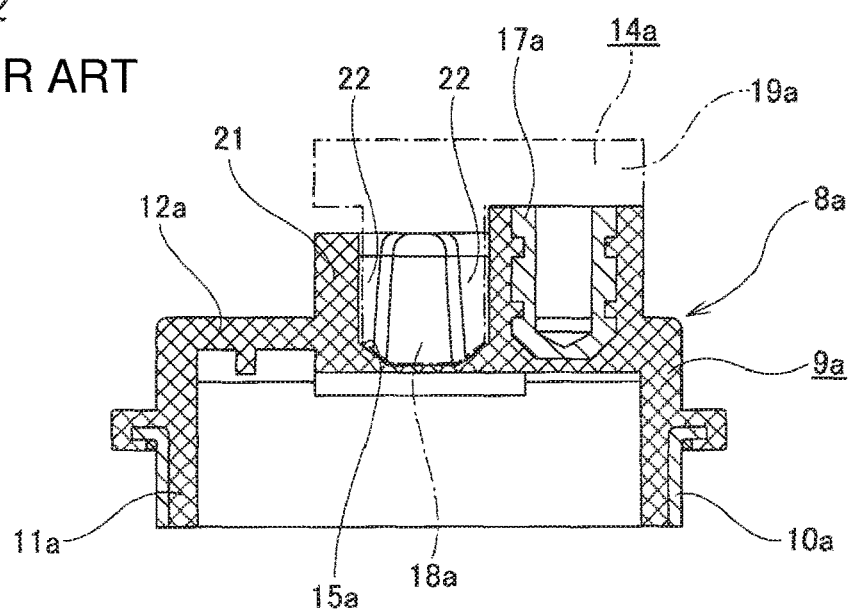
FIG. 12 is a sectional view taken along a line XII-XII of FIG. 11.

A second example of the embodiment of the present invention is described with reference to FIG. 9. When manufacturing a cap main body 34a configuring a bearing cap 33a by injection molding, it is difficult to position an axially inboard end face of a holder support part 50a and an axially inboard end face of the nut holding part 51a, which configure the cap main body 34a, on the same virtual plane. In the second example, considering this situation, a configuration where the axially inboard end faces of the nut holding part 51a and the nut 37 are arranged at an inner side, in the axial direction, of the axially inboard end face of the holder support part 50a by a dimension δ is adopted.

At a state where the sensor holder 46 is supported and fixed to the bearing cap 33a, the axially outboard surface of the mounting flange part 49 configuring the sensor holder 46 is contacted only to the axially inboard end faces of the nut holding part 51a and the nut 37, and a gap having a thickness dimension equivalent to dimension δ is formed between the axially outboard surface of the mounting flange part 49 and the axially inboard end face of the holder support part 50a.

Also, in the second example, the thickness dimension of the gap is set smaller than a radial thickness dimension of a gap between an inner peripheral surface of the holder support part 50a and the outer peripheral surface of the holder main body part 48 configuring the sensor holder 46.

Thereby, in the second example, even when the mud slurry is introduced into the gap between the axially outboard surface of the mounting flange part 49 and the axially inboard end face of the holder support part 50a, the mud slurry is moved downwards in the gap by the gravity action and the capillary phenomenon without moving towards the inside of the holder support part 50a and is finally discharged to the outside by the same effects (the effect of the flow of the upwardly convex circular arc shape and the Venturi effect) as the first example of the embodiment.

In the second example, a portion, which gets alignment with an inner diameter-side part of the holder support part 50a in the axial direction, of a bottom plate part 39a configuring the bearing cap 33a is provided with a bottomed sensor insertion hole 60 configured to open towards only the axially inboard surface of the bottom plate part 39a and to communicate with the inner diameter-side part of the holder support part 50a. The tip end portion of the holder main body part 48 is inserted (internally fitted) into the sensor insertion hole 60 without rattling, so that even when the gap is formed between the axially outboard surface of the mounting flange part 49 and the axially inboard end face of the holder support part 50a, as described above, the holder main body part 48 (the sensor 47) can be securely supported.

That is, since the holder support part 50a has the discontinuous part 52 at the lower end portion thereof, the holder main body part 48 can easily move at the inside of the holder support part 50a as much as that (to be the same as a case where a diameter difference between the inner peripheral surface of the holder support part 50a and the outer peripheral surface of the holder main body part 48 is large). For this reason, when vibrations are caused at a vehicle at a state where the sensor holder 46 is supported and fixed to the bearing cap 33a by the bolt 56, the holder main body part 48 is likely to rotate and oscillate about a central axis of the bolt 56 at the inside of the holder support part 50a, like a cantilever tip end portion. In particular, like the second example, in the case of the structure where the axially inboard surface of the mounting flange part 49 floats from the axially inboard end face of the holder support part 50a, the holder main body part 48 is more likely to rotate and oscillate. Therefore, in the second example, the sensor insertion hole 60 having no discontinuous part 52 is provided, and the tip end portion of the holder main body part 48 is inserted into the sensor insertion hole 60 without rattling, so that the rotation and oscillation of the holder main body part 48 as described above are difficult to occur.

Figure 2:
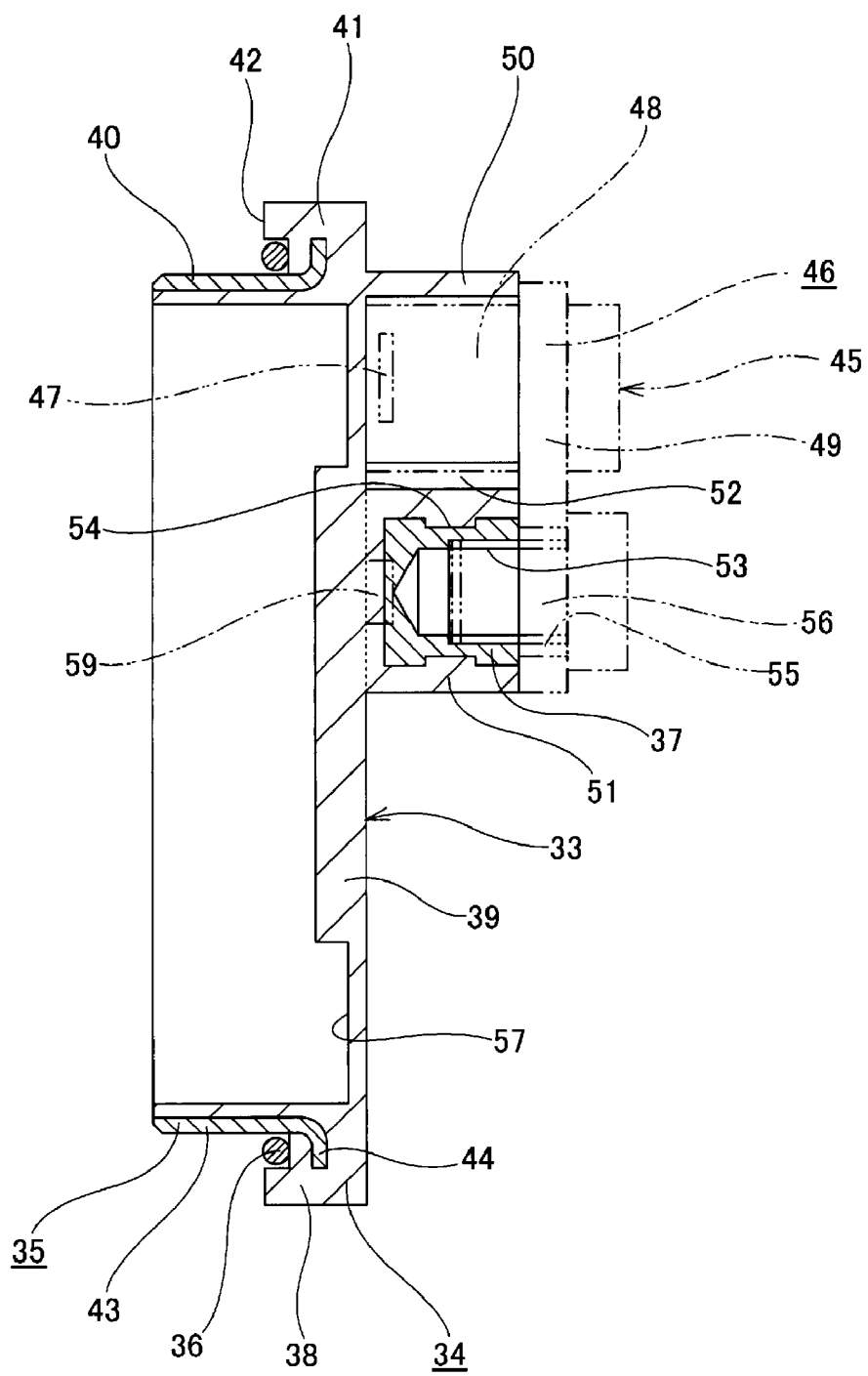
FIG. 2 is a sectional view depicting a bearing cap having a sensor unit.
Figure 3:
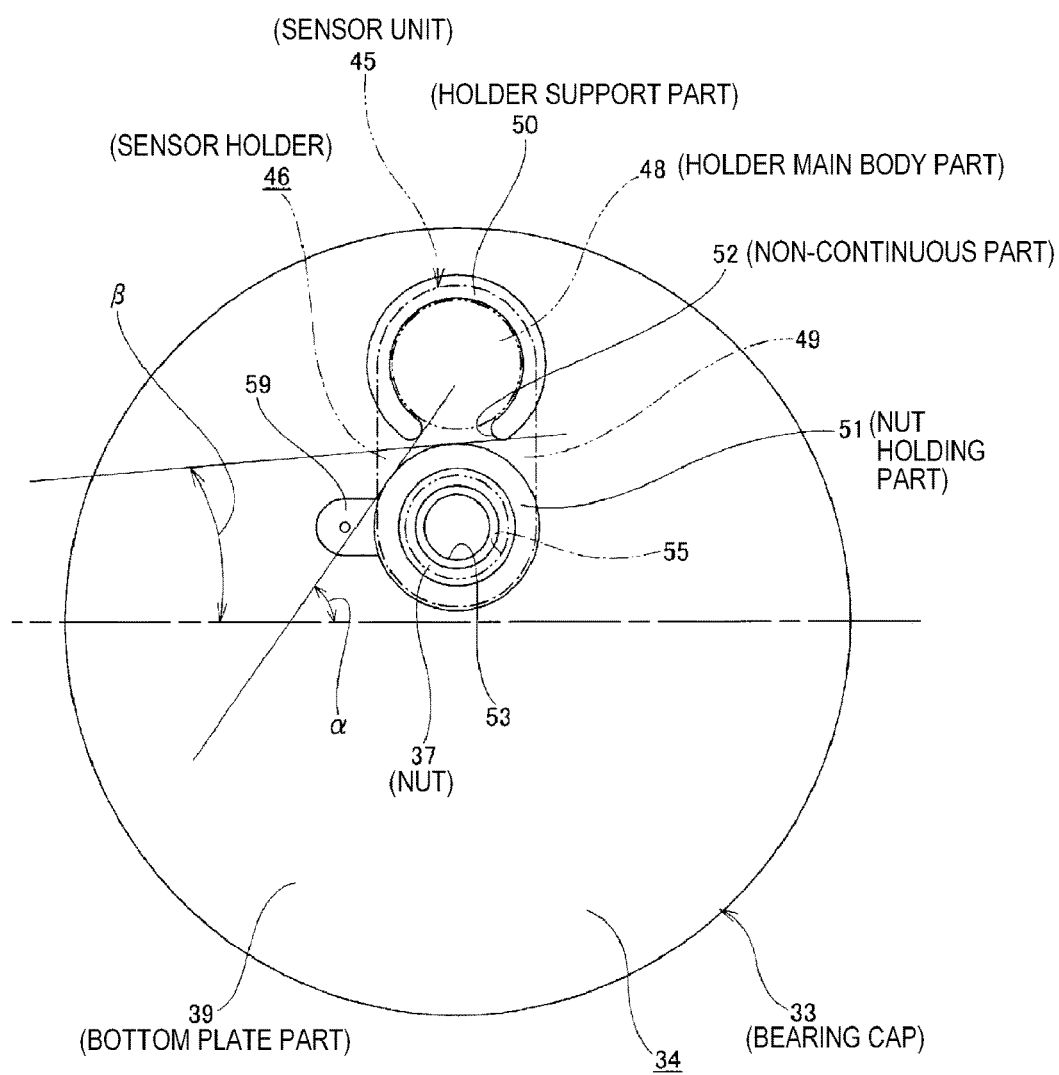
FIG. 3 is an end face view of the bearing cap, as seen from a right side of FIG. 2.
Figure 4:
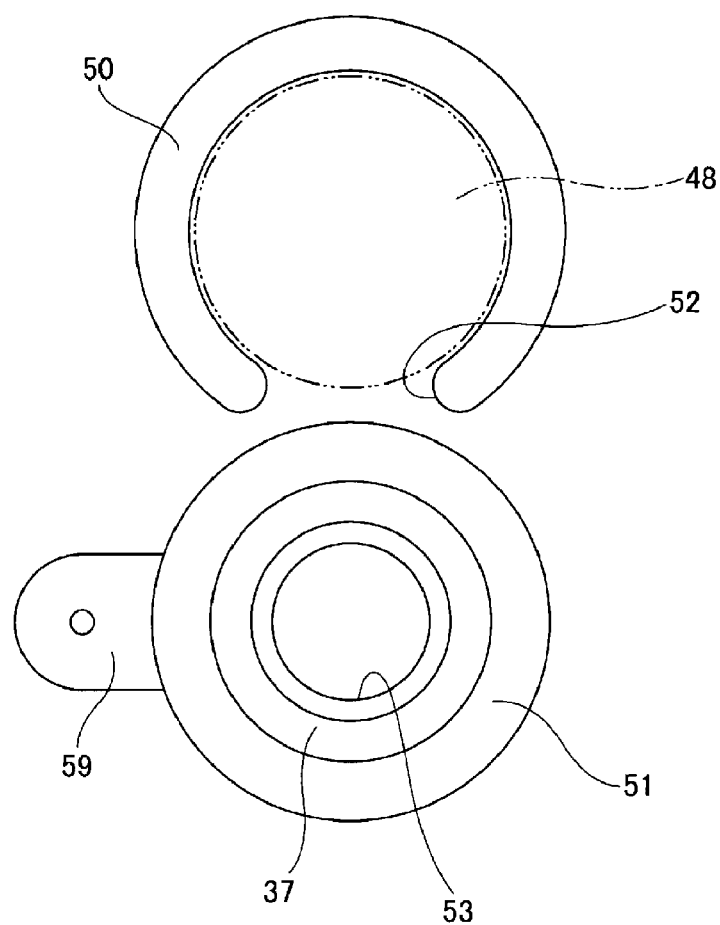
FIG. 4 is an enlarged view of main parts, depicting a part of FIG. 3.

In the second example, the axially outboard surface of the bottom plate part 39a is not provided with the annular concave portion 57 (refer to FIGS. 1 and 2). Instead, as described above, the tip end portion of the holder main body part 48 is inserted into the sensor insertion hole 60, so that the facing distance between the sensor 47 held at the tip end portion of the holder main body part 48 and the detected surface 32 (refer to FIGS. 1 and 2) of the encoder 13a is shortened.

The other configurations and operational effects are the same as those of the first example of the embodiment.

INDUSTRIAL APPLICABILITY

In the respective examples of the embodiment, the bearing cap has a structure formed by combining the cap main body made of synthetic resin and the member made of a material except for the synthetic resin, such as a metal ring. However, when implementing the present invention, the bearing cap may be entirely made of the synthetic resin. In the respective examples of the embodiment, the rolling bearing unit of the present invention is applied to a rolling bearing unit for wheel support. However, the rolling bearing unit of the present invention is not limited thereto and can also be applied to a variety of utilities such as a machine tool.

The present invention is based on a Japanese Patent Application No. 2015-26377 filed on Feb. 15, 2015, which is herein incorporated by reference.

DESCRIPTION OF REFERENCE NUMERALS

1, 1a: rolling bearing unit
2: outer ring
3: hub
4: rolling element
13, 13a: encoder
23a, 23b: outer raceway
27a, 27b: inner raceway
33, 33a: bearing cap
38: fitting cylinder part
39: bottom plate part
45: sensor unit
46: sensor holder
47: sensor
48: holder main body part
49: mounting flange part
50, 50a: holder support part
51, 51a, 51x, 51y: nut holding part

The invention claimed is:

1. A bearing cap having a sensor unit comprising:
a bearing cap mounted to an axially inboard end portion of an outer ring with plugging an axially inboard end opening of the outer ring configured to rotatably support a hub having an encoder supported to an axially inboard end portion of the hub towards an inner diameter-side of the outer ring via a plurality of rolling elements; and
a sensor unit including a sensor and a sensor holder supported and fixed to the bearing cap with holding the sensor, wherein
the bearing cap includes:
a fitting cylinder part fitted and fixed to the axially inboard end portion of the outer ring; and
a bottom plate part extending radially inwards from an axial portion of the fitting cylinder part,
at least the bottom plate part is made by injection molding of synthetic resin,
the bottom plate part is provided with a holder support part at a position axially facing a part of the encoder, which is an upper position of two positions adjacent to each other in an upper and lower direction at a using state, and is also provided with a nut holding part at a lower position of the two positions, the holder support part and the nut holding part are spaced from each other with protruding axially inwards from an axially inboard surface of the bottom plate part, the holder support part includes a notched cylinder shape having a discontinuous part at one place in a circumferential direction and the discontinuous part is arranged at a lower part at the using state, the nut holding part is configured to hold a nut at an inner diameter-side thereof, an upper surface, which faces a lower surface of the holder support part at the using state, of an outer peripheral surface of the nut holding part is configured as a convex curved surface of which a part facing the discontinuous part is positioned at the uppermost part, the sensor holder includes:

a holder main body part holding the sensor at an axially outboard end portion and inserted into the holder support part; and a mounting flange part, which is provided at a portion of the holder main body part protruding axially inwards from an inside of the holder support part and is configured to bring an axially outboard surface of the mounting flange part into contact with at least an axially inboard end face of the nut holding part out of an axially inboard end face of the holder support part and the axially inboard end face of the nut holding part, and the sensor holder is supported and fixed to the bearing cap by screwing a male screw part of a bolt axially inserted into the mounting flange part to the nut.

2. A rolling bearing unit comprising:

an outer ring having an outer raceway on an inner peripheral surface thereof and is configured not to rotate upon using;

a hub having an inner raceway on an outer peripheral surface thereof and is configured to rotate upon using;

a plurality of rolling elements provided between the outer raceway and the inner raceway so as to be freely rollable;

an encoder supported and fixed to an axially inboard end portion of the hub, concentrically with the hub, and characteristics of which are changed alternately and at an equal pitch in a circumferential direction;

a bearing cap mounted to the axially inboard end portion of the outer ring with plugging the axially inboard end opening of the outer ring;

a sensor unit supported and fixed to the bearing cap, wherein the bearing cap is the bearing cap having a sensor unit according to claim 1 with the sensor unit being supported and fixed to the bearing cap.

* * * * *